US012748294B2

(12) United States Patent
Crane

(10) Patent No.: US 12,748,294 B2
(45) Date of Patent: Sep. 29, 2026

(54) SUBSTRATES FOR PERFORMING QUANTIFICATION PROCESSES AND RELATED SYSTEMS AND METHODS

(71) Applicant: ILLUMINA, INC., San Diego, CA (US)

(72) Inventor: Bryan Crane, San Diego, CA (US)

(73) Assignee: ILLUMINA, INC., San Diego, CA (US)

(*) Notice: Subject to any disclaimer, the term of this patent is extended or adjusted under 35 U.S.C. 154(b) by 328 days.

(21) Appl. No.: 18/214,907

(22) Filed: Jun. 27, 2023

(65) Prior Publication Data

US 2023/0418039 A1 Dec. 28, 2023

Related U.S. Application Data

(60) Provisional application No. 63/355,879, filed on Jun. 27, 2022.

(51) Int. Cl.
*G02B 21/24* (2006.01)

(52) U.S. Cl.
CPC .................................. *G02B 21/244* (2013.01)

(58) Field of Classification Search
CPC ........... G02B 21/244; B01L 2300/0829; B01L 2300/168; G01N 2021/6463; G01N 21/6456; C12Q 1/686
See application file for complete search history.

(56) References Cited

U.S. PATENT DOCUMENTS

| | | | | |
|---|---|---|---|---|
| 4,988,618 | A | 1/1991 | Li et al. | |
| 5,558,839 | A | 9/1996 | Matte et al. | |
| 5,779,907 | A | 7/1998 | Yu | |
| 6,045,759 | A | 4/2000 | Ford et al. | |
| 6,355,164 | B1 | 3/2002 | Wendell et al. | |
| 6,386,403 | B2 | 5/2002 | Parsons et al. | |
| 6,405,609 | B1 | 6/2002 | Richards et al. | |
| 6,416,713 | B1 | 7/2002 | Ford et al. | |
| 6,537,818 | B2 | 3/2003 | Richards et al. | |
| 6,635,226 | B1 * | 10/2003 | Tso | G01N 27/44791 422/198 |
| 6,698,616 | B2 | 3/2004 | Hidle et al. | |
| 6,945,128 | B2 | 9/2005 | Ford et al. | |
| 6,983,866 | B2 | 1/2006 | Smart et al. | |
| 7,101,510 | B2 | 9/2006 | Vann et al. | |
| 7,160,510 | B2 | 1/2007 | Tajima et al. | |

(Continued)

FOREIGN PATENT DOCUMENTS

| | | |
|---|---|---|
| CN | 210175151 U | 3/2020 |
| WO | WO-2011/048521 A1 | 4/2011 |

(Continued)

*Primary Examiner* — Mustak Choudhury
(74) *Attorney, Agent, or Firm* — MARSHALL, GERSTEIN & BORUN LLP

(57) ABSTRACT

Substrates for performing quantification processes and related systems and methods are disclosed. In an implementation, an apparatus includes a substrate and an imaging system. The substrate includes a pair of plates and a plurality of spacers positioned between the plates to define a gap between the pair of plates. A portion of a sample is to be received within the gap of the substrate and the imaging system is to obtain image data of the portion of the sample. The image data is to be used to determine a concentration of the portion of the sample.

29 Claims, 15 Drawing Sheets

(56) References Cited

U.S. PATENT DOCUMENTS

| | | | |
|---|---|---|---|
| 7,243,860 | B2 | 7/2007 | Junkel et al. |
| 7,329,392 | B2 | 2/2008 | Bonwit et al. |
| 7,537,140 | B2 | 5/2009 | Lin |
| 7,947,512 | B2 | 5/2011 | Tajima et al. |
| 7,997,454 | B2 | 8/2011 | LaFlamme et al. |
| 8,647,593 | B2 | 2/2014 | Yin et al. |
| 8,658,042 | B2 | 2/2014 | Fasching et al. |
| 8,733,591 | B2 | 5/2014 | Ganzeboom et al. |
| 9,199,237 | B2 | 12/2015 | Baumgartner et al. |
| 9,470,611 | B2 | 10/2016 | Fawcett et al. |
| 9,504,981 | B2 | 11/2016 | Higgins |
| 9,538,872 | B2 | 1/2017 | Kestner et al. |
| 9,648,992 | B2 | 5/2017 | Harris et al. |
| 9,696,327 | B2 | 7/2017 | Belz et al. |
| 9,730,558 | B2 | 8/2017 | McNulty et al. |
| 10,040,087 | B2 | 8/2018 | Fujiwara et al. |
| 10,087,608 | B2 | 10/2018 | Dobizl et al. |
| 10,302,649 | B2 | 5/2019 | Clinton et al. |
| 10,335,556 | B2 | 7/2019 | Vedrine et al. |
| 10,337,967 | B2 | 7/2019 | Guckenberger et al. |
| 10,399,048 | B2 | 9/2019 | Siow et al. |
| 10,407,660 | B2 | 9/2019 | Souza |
| 10,532,363 | B2 | 1/2020 | Yao et al. |
| 10,620,226 | B2 | 4/2020 | Cook et al. |
| 10,702,878 | B2 | 7/2020 | Micnerski |
| 10,725,059 | B2 | 7/2020 | Glezer et al. |
| 11,079,022 | B2 | 8/2021 | McNulty et al. |
| 11,089,913 | B2 | 8/2021 | McNulty et al. |
| 11,179,726 | B2 | 11/2021 | Knight |
| 11,199,560 | B2 | 12/2021 | VanSickler et al. |
| 11,246,457 | B2 | 2/2022 | McNulty et al. |
| 11,253,111 | B2 | 2/2022 | Casper et al. |
| 2002/0070173 | A1 | 6/2002 | Otto et al. |
| 2004/0072365 | A1 | 4/2004 | Rose et al. |
| 2005/0001989 | A1 | 1/2005 | Adey et al. |
| 2005/0019898 | A1* | 1/2005 | Adey .................. B01J 19/0093 435/293.1 |
| 2005/0092662 | A1 | 5/2005 | Gilbert et al. |
| 2006/0032867 | A1 | 2/2006 | Grant |
| 2008/0240841 | A1 | 10/2008 | Katz et al. |
| 2009/0090431 | A1 | 4/2009 | Yacko et al. |
| 2009/0111174 | A1* | 4/2009 | Parker ............... B01L 3/502761 977/751 |
| 2009/0176308 | A1 | 7/2009 | Griebel et al. |
| 2009/0191638 | A1 | 7/2009 | Schilffarth et al. |
| 2011/0008096 | A1 | 1/2011 | Coleman et al. |
| 2011/0022237 | A1 | 1/2011 | Bennett |
| 2011/0143947 | A1 | 6/2011 | Chamberlin et al. |
| 2012/0289433 | A1 | 11/2012 | Wang et al. |
| 2013/0075420 | A1 | 3/2013 | Tramontina et al. |
| 2014/0263451 | A1 | 9/2014 | Ross et al. |
| 2015/0209786 | A1 | 7/2015 | Hage et al. |
| 2016/0109693 | A1* | 4/2016 | Feng ..................... H04N 23/55 348/79 |
| 2016/0137974 | A1 | 5/2016 | Souza |
| 2016/0305972 | A1 | 10/2016 | Ogg et al. |
| 2018/0119689 | A1 | 5/2018 | Van de Ven et al. |
| 2018/0203029 | A1 | 7/2018 | Hamasaki et al. |
| 2019/0111424 | A1 | 4/2019 | Chou et al. |
| 2019/0224666 | A1 | 7/2019 | Tajima et al. |
| 2019/0239975 | A1 | 8/2019 | Bernet et al. |
| 2019/0283029 | A1 | 9/2019 | German et al. |
| 2019/0328980 | A1 | 10/2019 | Vedrine et al. |
| 2020/0191808 | A1 | 6/2020 | Cook et al. |
| 2020/0290037 | A1 | 9/2020 | Salomon et al. |
| 2021/0039096 | A1* | 2/2021 | Spero .................. B01L 3/50273 |
| 2021/0101154 | A1 | 4/2021 | Dulaff et al. |
| 2021/0162414 | A1* | 6/2021 | Liu .................. B01L 3/502761 |
| 2021/0163169 | A1 | 6/2021 | Bohamed |
| 2021/0230579 | A1 | 7/2021 | Park et al. |
| 2021/0255177 | A1* | 8/2021 | Chou ............... G01N 33/54373 |
| 2021/0276005 | A1 | 9/2021 | Woodward |
| 2021/0356482 | A1 | 11/2021 | Moffitt et al. |
| 2021/0389338 | A1 | 12/2021 | Kochar et al. |
| 2022/0001045 | A1 | 1/2022 | Al-Jazaeri |

FOREIGN PATENT DOCUMENTS

| | | | |
|---|---|---|---|
| WO | WO-2013/107646 | A1 | 7/2013 |
| WO | WO-2017/040975 | A1 | 3/2017 |
| WO | WO-2018/031232 | A1 | 2/2018 |
| WO | WO-2019/004636 | A2 | 1/2019 |
| WO | WO-2019/087176 | A1 | 5/2019 |
| WO | WO-2019/195818 | A1 | 10/2019 |

* cited by examiner

SUBSTRATES FOR PERFORMING QUANTIFICATION PROCESSES AND RELATED SYSTEMS AND METHODS

RELATED APPLICATION

This application claims the benefit of and priority to U.S. Provisional Patent Application No. 63/355,879, filed Jun. 27, 2022, the content of which is incorporated by reference herein in its entireties and for all purposes.

BACKGROUND

DNA libraries may be prepared to allow samples to be sequenced.

SUMMARY

Shortcomings of the prior art can be overcome and benefits as described later in this disclosure can be achieved through the provision of library preparation systems and methods. Various implementations of the apparatus and methods are described below, and the apparatus and methods, including and excluding the additional implementations enumerated below, in any combination (provided these combinations are not inconsistent), may overcome these shortcomings and achieve the benefits described herein.

In a first implementation, an apparatus includes a substrate and an imaging system. The substrate includes a pair of plates and a plurality of spacers positioned between the plates to define a gap between the pair of plates. A portion of a sample is to be received within the gap of the substrate and the imaging system is to obtain image data of the portion of the sample. The image data is to be used to determine a concentration of the portion of the sample.

In a second implementation, a method includes dispensing a sample onto a first plate of a substrate, positioning a second plate of the substrate on the first plate and defining a gap between the first plate and the second plate using a plurality of spacers, obtaining image data of the sample, and determining a concentration of the sample using the image data.

In a third implementation, a method includes dispensing a sample in an inlet of a channel of a substrate, obtaining image data of the sample, determining a concentration of the sample using the image data, and flowing the sample out of an outlet of the channel.

In a fourth implementation, an apparatus includes a substrate and an imaging system. The substrate includes a channel including an inlet and an outlet, and a valve. The outlet is in fluid communication with the channel. The valve is disposed between the inlet and the outlet. The channel includes a first portion between the valve and the inlet and a second portion between the valve the outlet. A portion of a sample is to be received within the first portion of the channel of the substrate and the imaging system is to obtain image data of the portion of the sample. The image data to be used to determine a concentration of the portion of the sample.

In a fifth implementation, an apparatus includes a substrate including a channel including an inlet and an inlet, and a valve disposed between the inlet and the outlet. The channel includes a first portion between the valve and the inlet and a second portion between the valve the outlet. A portion of a sample is to be received within the first portion of the channel of the substrate and an imaging system is to obtain image data of the portion of the sample. The image data to be used to determine a concentration of the portion of the sample.

In a sixth implementation, an apparatus includes a circular substrate including a plurality of channels. Each channel includes an inlet, an outlet, and a valve disposed between the inlet and the outlet. The channel includes a first portion between the valve and the inlet and a second portion between the valve the outlet.

In a seventh implementation, a method includes rotating a substrate around an axis of rotation at a first rate to draw a portion of a sample into a first portion of a channel of the substrate. The substrate includes the channel, an inlet, an outlet in fluid communication with the channel, and a valve disposed between the inlet and the outlet. The channel includes the first portion between the valve and the inlet and a second portion between the valve and the outlet. The method includes stopping the rotation of the substrate and obtaining image data of the portion of the sample. The image data to be used to determine a concentration of the portion of the sample. The method includes rotating the substrate around the axis of rotation at a second rate to urge the portion of the sample through the valve and into the second portion of the channel of the substrate and out of the outlet.

In an eighth implementation, a method includes rotating a substrate around an axis of rotation to draw a portion of a sample into a first portion of a channel of the substrate. The substrate including the channel, an inlet, an outlet in fluid communication with the channel, and a valve disposed between the inlet and the outlet. The channel includes the first portion between the valve and the inlet and a second portion between the valve and the outlet. The method includes stopping the rotation of the substrate and obtaining image data of the portion of the sample. The image data to be used to determine a concentration of the portion of the sample. The method includes actuating the valve to an open position and rotating the substrate around the axis of rotation to urge the portion of the sample through the valve and into the second portion of the channel of the substrate and out of the outlet.

In further accordance with the foregoing the first, second, third, fourth, fifth, sixth, seventh, and/or eighth implementations, an apparatus and/or method may further include or comprise any one or more of the following:

In an implementation, the spacers include ball bearings having opposing flat surfaces.

In another implementation, the plurality of spacers include three spacers.

In another implementation, the gap is about 500 micrometers.

In another implementation, the apparatus includes a channel that is defined between the pair of plates.

In another implementation, the substrate further includes a seal positioned between the pair of plates and defines the channel.

In another implementation, the seal is positioned around a perimeter of the pair of plates.

In another implementation, the substrate includes a mask.

In another implementation, the mask is an opaque mask.

In another implementation, the substrate includes an inlet and an outlet in fluid communication with the gap.

In another implementation, the substrate includes a plurality of channels.

In another implementation, the substrate includes a first inlet, a second inlet, a third inlet, and an outlet in fluid communication with the gap.

In another implementation, the spacers include ball bearings having opposing flat surfaces.

In another implementation, the plurality of spacers includes three spacers.

In another implementation, the method also includes positioning a seal around a perimeter of the first plate and the second plate.

In another implementation, obtaining the image data includes obtaining the image data through a window of the substrate.

In another implementation, the window includes an unmasked region and a masked region may surround the unmasked region.

In another implementation, the method includes dispensing a fluid into the channel to separate the sample and another sample.

In another implementation, the fluid includes oil.

In another implementation, dispensing the fluid into the channel includes dispensing the fluid into a second inlet of the channel.

In another implementation, the apparatus includes a pump to move the sample from the inlet to the outlet.

In another implementation, the pump comprises a plate comprising an axis of rotation and an actuator to rotate the plate, the substrate coupled to the plate and extending radially from the axis of rotation.

In another implementation, the apparatus includes a second substrate coupled to the plate and extending radially from the axis of rotation.

In another implementation, the plate includes a first position and a second position. The substrate is positioned at the first position and the second substrate positioned at the second position. The first position opposite the second position.

In another implementation, the second substrate is a mirror image of the substrate on the plate.

In another implementation, the pump includes an optical access area.

In another implementation, the apparatus includes a waste reservoir fluidly coupled to the outlet.

In another implementation, the waste reservoir includes a vent.

In another implementation, the vent includes a porous frit.

In another implementation, the waste reservoir includes a disposable microfluidic card assembly.

In another implementation, the valve includes a virtual valve.

In another implementation, the virtual valve includes a constriction.

In another implementation, the portion of the sample is to flow from the first portion, through the valve, the second portion, and the outlet after the image data of the portion of the sample is obtained.

In another implementation, the valve includes a virtual valve.

In another implementation, the virtual valve includes a constriction.

In another implementation, the first portion of the channel has a first width, the second portion of the channel has a second width, and the virtual valve has a third width, the third width less than the first width and the second width.

In another implementation, the channel has a height of between about 200 micrometers and about 500 micrometers.

In another implementation, the substrate includes a mask.

In another implementation, the mask is an opaque mask.

In another implementation, the substrate includes a microfluidic card.

In another implementation, the valve includes an elastomer valve or a rotary face-sealing valve.

In another implementation, the apparatus includes an inlet port at the inlet that is to funnel the portion of the sample into the channel.

In another implementation, the inlet port includes a flow passage including a frustrum-shaped flow passage.

In another implementation, the inlet port includes a first surface and a second surface. The first surface is coupled to the substrate. The frustrum-shaped flow passage includes a base opening at the first surface and a top opening at the second surface. The base opening having a perimeter. The inlet being tangential to the base opening.

In another implementation, the circular substrate includes a plastic disc.

In another implementation, the circular substrate includes a circular wafer.

In another implementation, the circular substrate includes an axis of rotation. The apparatus includes an actuator to rotate the circular substrate about the axis of rotation.

In another implementation, the method includes receiving the portion of the sample in a waste reservoir fluidly coupled to the outlet.

In another implementation, the method includes rinsing the channel by flowing a rinse fluid through the channel and between the inlet and the outlet.

In another implementation, the valve is a virtual valve.

In another implementation, the virtual valve includes a constriction.

In another implementation, the method includes rinsing the channel by flowing a rinse fluid through the channel and between the inlet and the outlet.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect described herein. In particular, all combinations of claimed subject matter appearing at the end of this disclosure are contemplated as being part of the subject matter disclosed herein.

DETAILED DESCRIPTION

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

Figure 1:
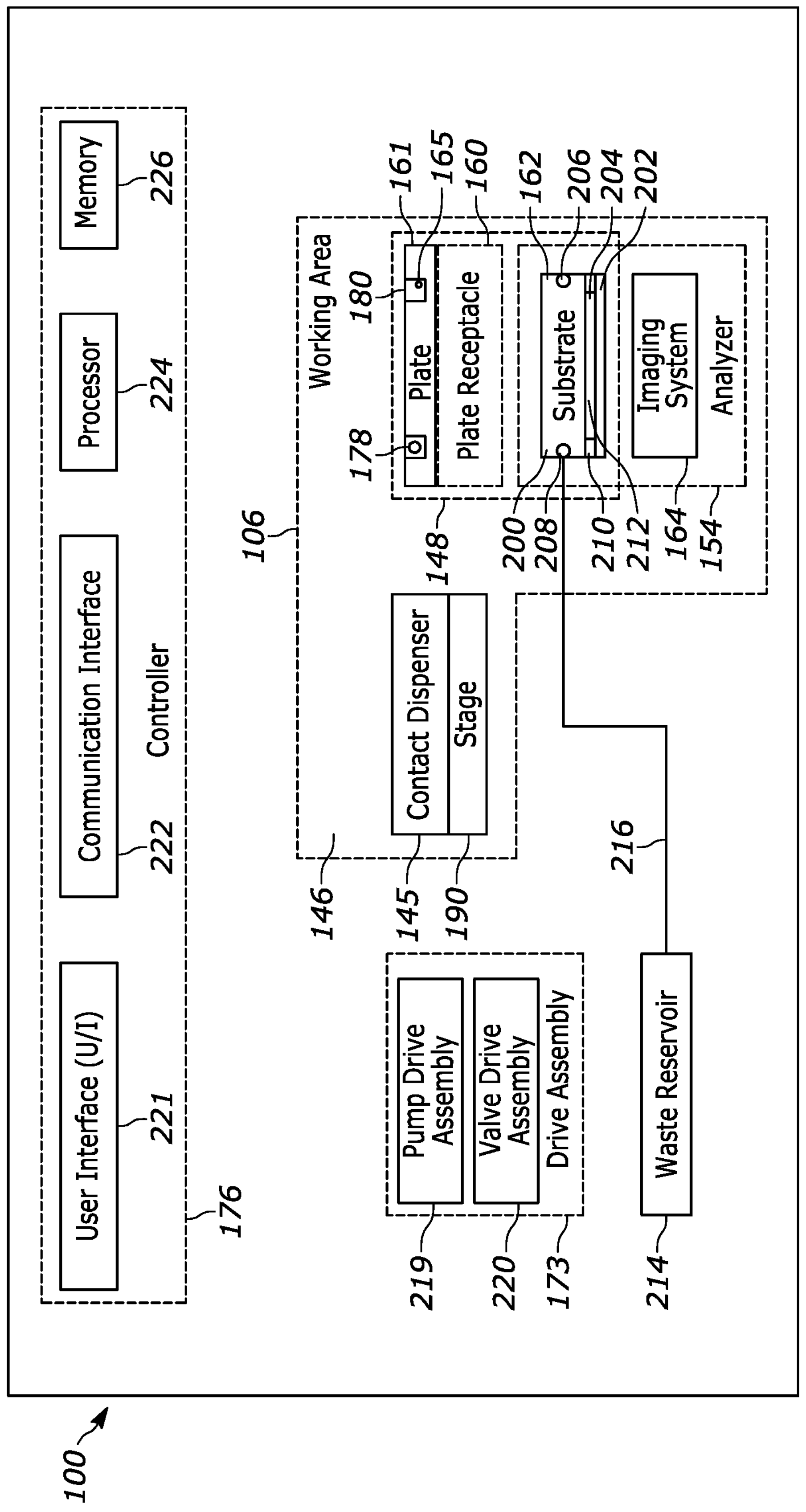
FIG. 1 illustrates a schematic diagram of an implementation of a system in accordance with the teachings of this disclosure.

FIG. 1 illustrates a schematic diagram of an implementation of a system 100 in accordance with the teachings of this disclosure. The system 100 can be used to automatically, easily, and efficiently perform quantification processes used when preparing DNA libraries for sequencing applications, for example. The system 100 includes a working area 106 in the implementation shown. The working area 106 includes a contact dispenser 145, a stage 148, and an analyzer area 154 in the implementation shown. The stage 148 may be an x-y stage.

The stage 148 has a plate receptacle 160 that receives a plate 161 and the analyzer area 154 includes a substrate 162 and an imaging system 164. The plate receptacle 160 may be referred to as a plate station. The imaging system 164 may be a fluorescent imaging system, a fluorescence spectrophotometer including an objective lens, and/or a solid-state imaging device. The solid-state imaging device may include a charge coupled device (CCD) and/or a complementary metal oxide semiconductor (CMOS).

The system 100 also includes a drive assembly 173 and a controller 176. The plate 161 may contain different samples 165. The samples 165 may be a biological sample derived from a human, animal, plant, bacteria, or fungi. Other sources of obtaining the biological samples may prove suitable. A stage 190 may be coupled to and used to move the contact dispenser 145. The stage 190 may be a z-stage. The stage 190 may alternatively be omitted.

The analyzer area 154 of the system 100 can be used to perform quantification processes. The substrate 162 of the analyzer area 154 is carried by the stage 148 in the implementation shown, and the imaging system 164 is spaced from the stage 148 and coupled to a portion of the system 100 such as a frame of the system 100. The imaging system 164 may alternatively be carried by the stage 148. The substrate 162 is shown including a pair of plates 200, 202 between which a gap 204 is defined. The plate 200 may be referred to as the first plate or alternatively as the second plate and the plate 202 may be referred to as the second plate or alternatively as the first plate. The substrate 162 also has an inlet 206 and an outlet 208 in fluid communication with the gap 204 and a seal 210 positioned between the pair of plates 200, 202. The plates 202, 202 and the seal 210 define a channel 212 between the inlet 206 and the outlet 208. A waste reservoir 214 is fluidly coupled to the outlet 208 of the substrate 162 by a fluidic line 216. A pump 215 may be fluidly coupled between the outlet of the substrate 162 and the waste reservoir 214. The pump 215 may be implemented by a syringe pump, a peristaltic pump, and/or a diaphragm pump. Other types of fluid transfer devices may be used, however.

The stage 148 aligns the contact dispenser 145 with the plate 161 to perform the quantification processes and the contact dispenser 145 aspirates a portion of a reagent 178 and the sample 165 from a well 180 of the plate 161. The portion of the reagent 178 and the sample 165 may be about 2 μL.

The stage 148 aligns the contact dispenser 145 with the inlet 206 of the substrate 162 and the contact dispenser 145 dispenses the portion of the reagent 178 and the sample 165 into the inlet 206 of the substrate 162. The portion of the reagent 178 and the sample 165 may flow and/or be positioned between the inlet 206 and the outlet 208 in this implementation and the imaging system 164 obtains image data of the portion of the reagent 178 and the sample 165. The imaging system 164 and/or the system 100 uses the image data to determine a concentration of the sample 165. Negative pressure, oil, and/or another substance may be used to urge the portion of the reagent 178 and the sample 165 between the inlet 206 and the outlet 208. The first plate 200 may alternatively be hingably coupled or removably coupled to the second plate 202 to allow the contact dispenser 145 to dispense the portion of the reagent 178 and the sample 165 onto the second plate 202 prior to the first plate 200 being positioned overtop of the second plate 202 (see, FIG. 4, for example).

The drive assembly 173 includes a pump drive assembly 219 and a valve drive assembly 220. The controller 176 includes a user interface 221, a communication interface 222, one or more processors 224, and a memory 226 storing instructions executable by the one or more processors 224 to perform various functions including the disclosed implementations. The user interface 221, the communication interface 222, and the memory 226 are electrically and/or communicatively coupled to the one or more processors 224.

In an implementation, the user interface 221 receives input from a user and provides information to the user associated with the operation of the system 100 and/or an analysis taking place. The user interface 221 may include a touch screen, a display, a key board, a speaker(s), a mouse, a track ball, and/or a voice recognition system. The touch screen and/or the display may display a graphical user interface (GUI).

In an implementation, the communication interface 222 enables communication between the system 100 and a remote system(s) (e.g., computers) using a network(s). The network(s) may include an intranet, a local-area network (LAN), a wide-area network (WAN), the intranet, etc. Some of the communications provided to the remote system may be associated with quantification process(es) generated or otherwise obtained by the system 100. Some of the communications provided to the system 100 may be associated with an amplification process(es), a cleanup process(es), a library normalization process(es), and/or a pooling process(es) to be executed by the system 100.

The one or more processors 224 and/or the system 100 may include one or more of a processor-based system(s) or a microprocessor-based system(s). In some implementations, the one or more processors 224 and/or the system 100 includes a reduced-instruction set computer(s) (RISC), an application specific integrated circuit(s) (ASICs), a field programable gate array(s) (FPGAs), a field programable logic device(s) (FPLD(s)), a logic circuit(s), and/or another logic-based device executing various functions including the ones described herein.

The memory 226 can include one or more of a hard disk drive, a flash memory, a read-only memory (ROM), erasable programable read-only memory (EPROM), electrically erasable programable read-only memory (EEPROM), a random-access memory (RAM), non-volatile RAM (NVRAM) memory, a compact disk (CD), a digital versatile disk (DVD), a cache, and/or any other storage device or storage disk in which information is stored for any duration (e.g., permanently, temporarily, for extended periods of time, for buffering, for caching).

Figure 2:
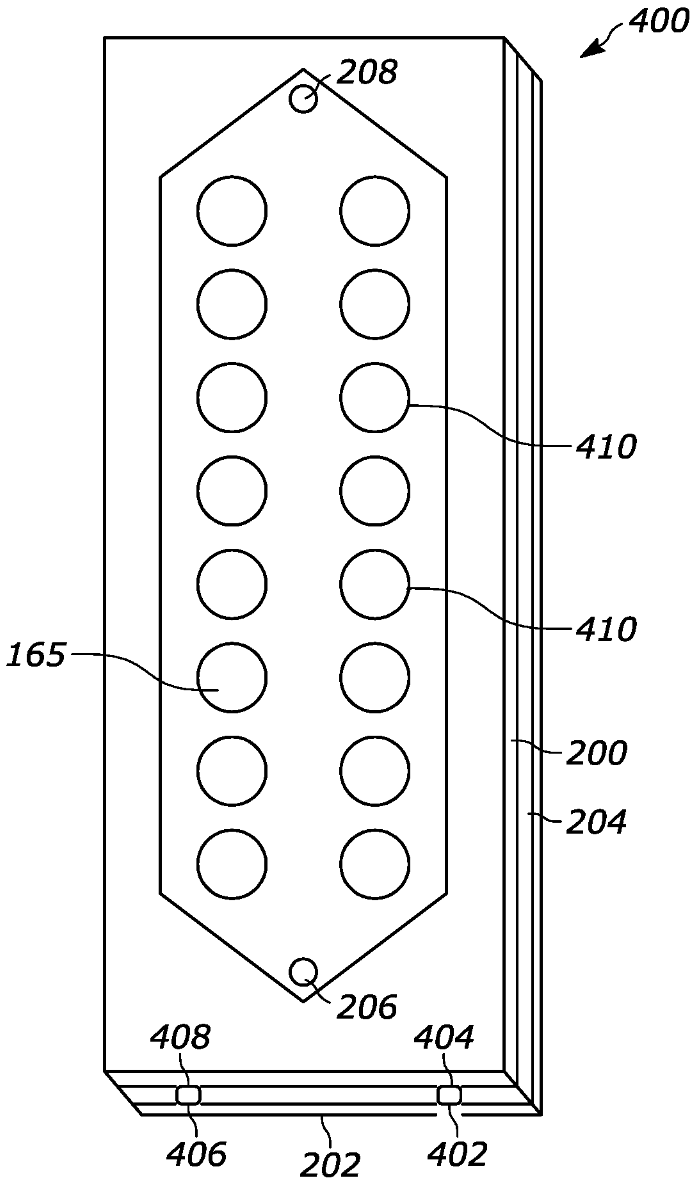
FIG. 2 is a top isometric view of an implementation of a substrate that can be used to implement the substrate of FIG. 1.

FIG. 2 is a top isometric view of an implementation of a substrate 400 that can be used to implement the substrate 162 of FIG. 1. The substrate 400 includes the pair of plates 200, 202 and spacers 402 positioned between the plates 200, 202 to define the gap 204 between the plates 200, 202. The spacers 402 are ball bearings 404 having opposing flat surfaces 406, 408. The substrate 400 may include three ball bearings 404 to define the gap 204 between the plates 200, 202 to be about 500 μm. As set forth herein, the phrase "about 500 μm" means +/−5 μm of 500 μm including 500 μm itself and/or accounts for manufacturing tolerances.

Portions 410 of the sample 165 and the reagent 178 are shown positioned between the plates 200, 202. The portions 410 may be referred to as droplets. Each of the portions 410 may relate to a different sample 165. The portions 410 may be approximately 2 μL each and have a nominal diameter of about 2 mm.

Figure 3:
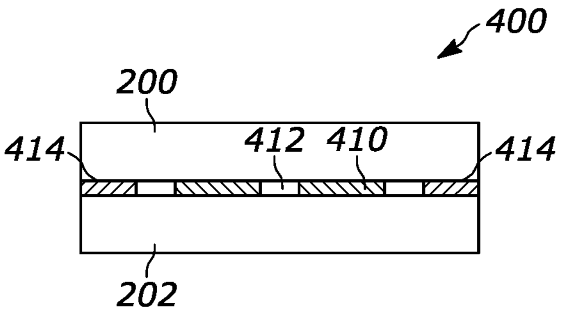
FIG. 3 is a cross-sectional view of the substrate of FIG. 2.

FIG. 3 is a cross-sectional view of the substrate 400 of FIG. 2. The substrate 400 shows a channel 412 defined between the plates 200, 202 and a seal 414 positioned between the plates 200, 202 that defines the channel 412. The plates 200, 202 also define the channel 412. The seal 414 may be a compliant gasket seal. The channel 412 of the substrate 400 can be flushed and/or cleaned using a liquid such as ethanol and purged with air after the quantification processes are complete. The portions 410 of the sample 165 and the reagent 178 can be flowed to the waste reservoir 214, for example.

Figure 4:
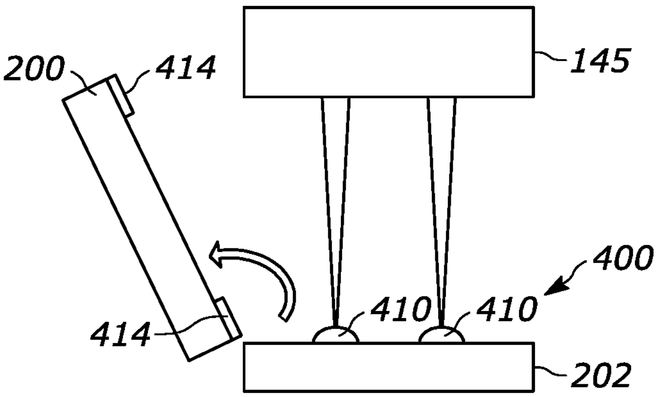
FIG. 4 is a cross-sectional view of the substrate of FIG. 2 showing the first plate removed from the second plate and the contact dispenser dispensing the portions onto the second plate.

FIG. 4 is a cross-sectional view of the substrate 400 of FIG. 2 showing the first plate 200 removed from the second plate 202 and the contact dispenser 145 dispensing the portions 410 onto the second plate 202.

Figure 5:
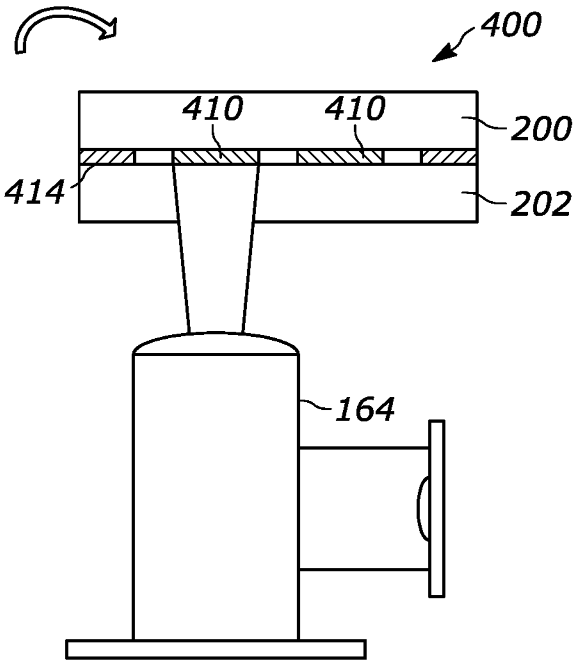
FIG. 5 is a cross-sectional view of the substrate of FIG. 2 showing the first plate positioned over top of the second plate and the imaging system obtaining image data of one of the portions.

FIG. 5 is a cross-sectional view of the substrate 400 of FIG. 2 showing the first plate 200 positioned over top of the second plate 202 and the imaging system 164 obtaining image data of one of the portions 410. The imaging system 164 and/or the system 100 may use the image data to determine an intensity value and a diameter of the portion 410. The imaging system 164 and/or the system 100 can thereafter compute a concentration of the portion 410 using a total florescent measurement, for example.

The imaging system 164 can also or alternatively be used to perform a calibration process where the imaging system 164 obtains image data of the portion 410 and the imaging system 164 and/or the system 100 calibrates the contact dispenser 145 by determining a volume of the portion 410, comparing the determined volume of the portion 410 to a reference volume, and determining a difference between the determined volume and the reference volume. The system 100 can calibrate and/or change an amount of liquid dispensed by the contact dispenser 145 if the difference between the determined volume and the reference volume is greater than a threshold.

Figure 6:
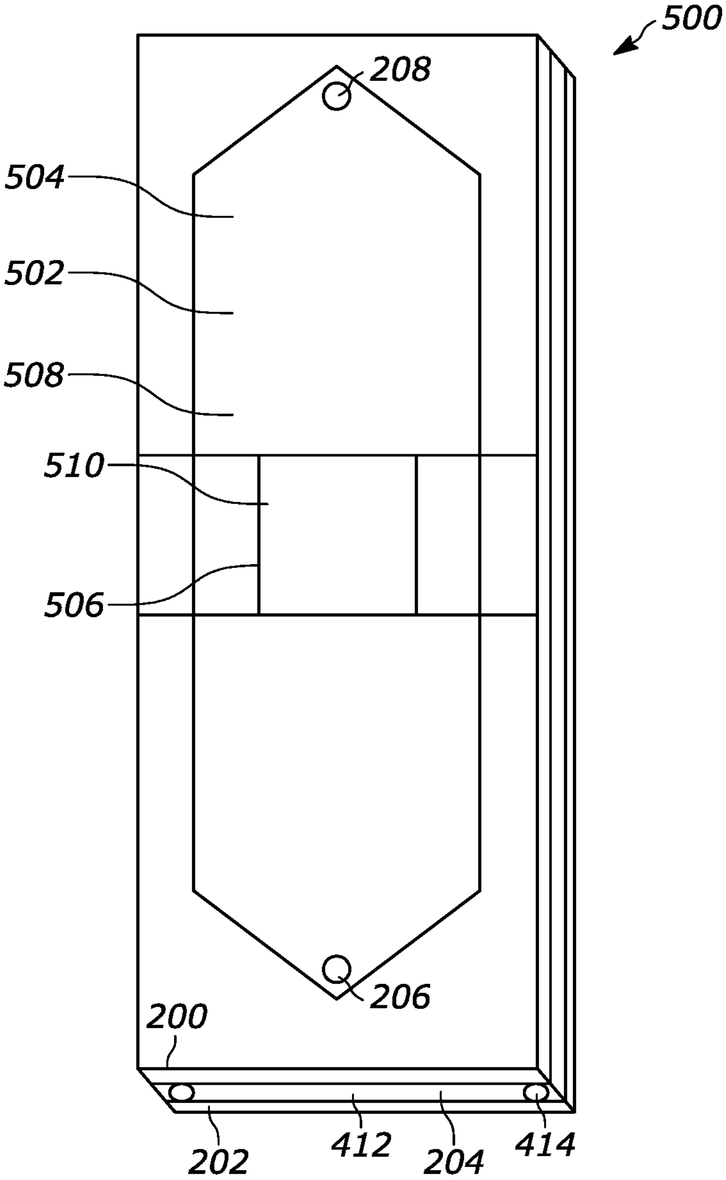
FIG. 6 is a top isometric view of an implementation of a substrate that can be used to implement the substrate of FIG. 1.

FIG. 6 is a top isometric view of an implementation of a substrate 500 that can be used to implement the substrate 162 of FIG. 1. The substrate 500 of FIG. 6 is similar to the substrate 400 of FIG. 2. The substrate 500 of FIG. 6 includes a mask 502 however that is an opaque mask 504 in the implementation shown. The mask 502 defines a window 506 that allows the imaging system 164 to obtain image data of a portion 510 of the sample 165 and the reagent 178. The portion 510 may be a 2 μL droplet. The window 506 may be referred to as an unmasked region. An area 508 of the mask 502 may be relatively well defined and is shown surrounding the window 506. The imaging system 164 may alternatively be used to measure the area 508 of the mask 502. The imaging system 164 may be able to measure the area 508 of the mask 502 within about 5% accuracy. The accuracy of measurement by the imaging system 164 may be different, however.

The substrate 500 may include the spacers to accurately define the gap 204 between the plates 200, 202. The gap 204 may be between about 200 μm and about 500 μm. The imaging system 164 may alternatively be used to measure the gap 204. The imaging system 164 may be able to measure the gap 204 within about 1% accuracy. The imaging system 164 may be able to determine a liquid volume of the portion 510 within about 7% accuracy.

Figure 7:
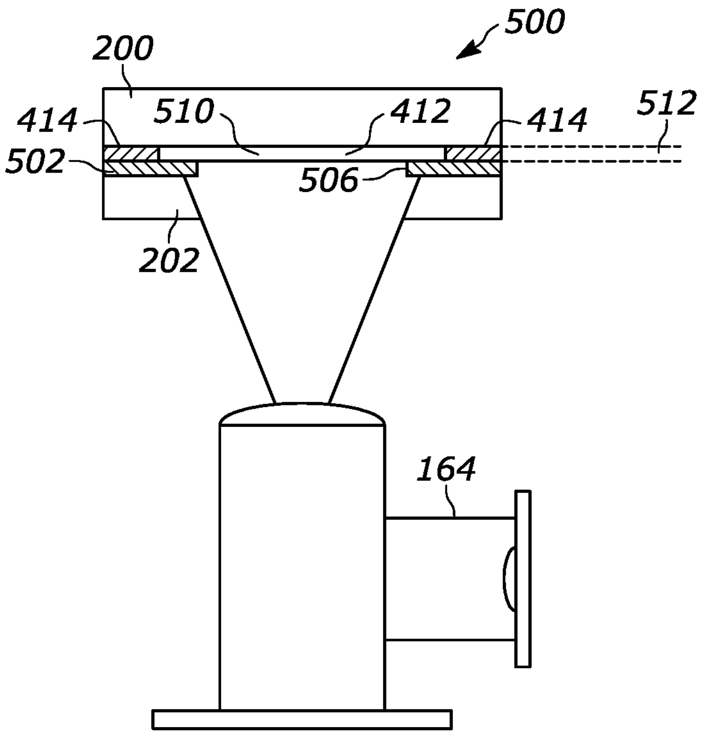
FIG. 7 is a cross-sectional view of the substrate of FIG. 6 showing the first plate positioned over top of the second plate and the imaging system obtaining image data of the portion.

FIG. 7 is a cross-sectional view of the substrate 500 of FIG. 6 showing the first plate 200 positioned over top of the second plate 202 and the imaging system 164 obtaining image data of the portion 510. The imaging system 164 and/or the system 100 may use the image data to determine an intensity value of the portion 510 viewable through the window 506. The imaging system 164 and/or the system 100 can use the intensity value and a thickness 512 of the gap 204 to determine a concentration of the portion 510. The channel 412 of the substrate 500 can be flushed and/or cleaned using a liquid such as ethanol and purged with air after the quantification processes are complete.

Figure 8:
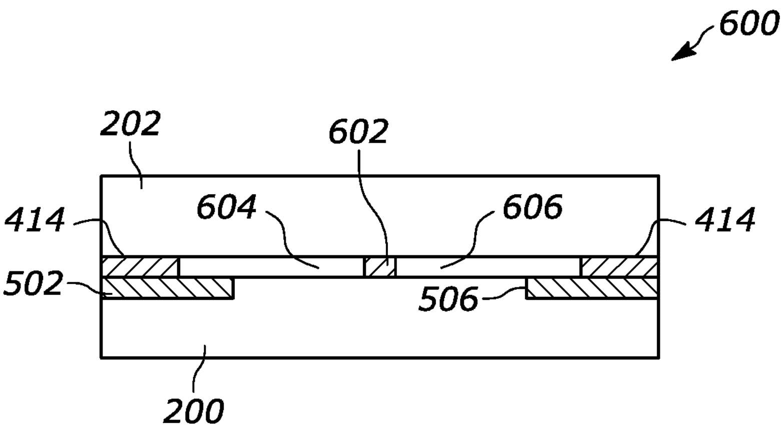
FIG. 8 is a cross-sectional view of an implementation of a substrate that can be used to implement the substrate of FIG. 1.

FIG. 8 is a cross-sectional view of an implementation of a substrate 600 that can be used to implement the substrate 162 of FIG. 1. The substrate 600 of FIG. 8 is similar to the substrate 500 of FIG. 7. The substrate 600 of FIG. 8 includes a divider 602 however that is coupled between the plates 200, 202 and defines a first channel 604 and a second channel 606. Put another way, the substrate 600 has a plurality of channels 604, 606. Each of the channels 604, 606 can have a corresponding inlet 206 and/or a corresponding outlet 208. Each channel 604, 606 can thus receive a different sample and multiple samples can be processed and/or flowed through the substrate 600 at the same or similar times. While the substrate 600 is shown having two channels 604, 606, the substrate 600 can have any number of channels 604, 606.

Figure 9:
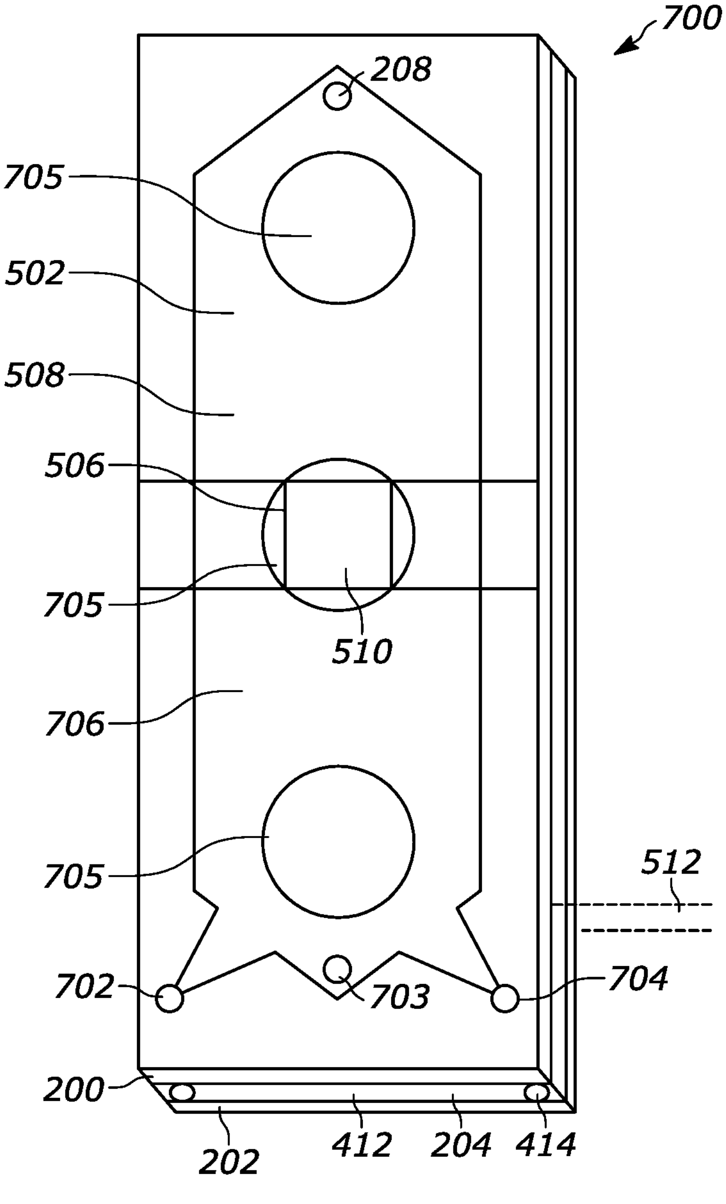
FIG. 9 is a top isometric view of an implementation of a substrate that can be used to implement the substrate of FIG. 1.

FIG. 9 is a top isometric view of an implementation of a substrate 700 that can be used to implement the substrate 162 of FIG. 1. The substrate 700 of FIG. 9 is similar to the substrate 500 of FIG. 6. The substrate 700 of FIG. 9 includes a first inlet 702, a second inlet 703, a third inlet 704, and the outlet 208 in fluid communication with the gap 204. Portions 705 of the sample 165 and the reagent 178 are shown separated by another fluid 706. The portions 705 may be referred to as droplets. The fluid 706 may be oil. The contact dispenser 145 deposits the portions 705 in the second inlet 703 in operation and the fluid 706 is dispensed into the first inlet 702 and/or the third inlet 704. The fluid 706 separates the portions 705. The channel 412 may be under negative pressure and the negative pressure may sequentially urge the portions 705 between the second inlet 703 and the outlet 208. The fluid 706 may also or alternatively be used to urge the portions 705 between the second inlet 703 and the outlet 208.

Figure 10:
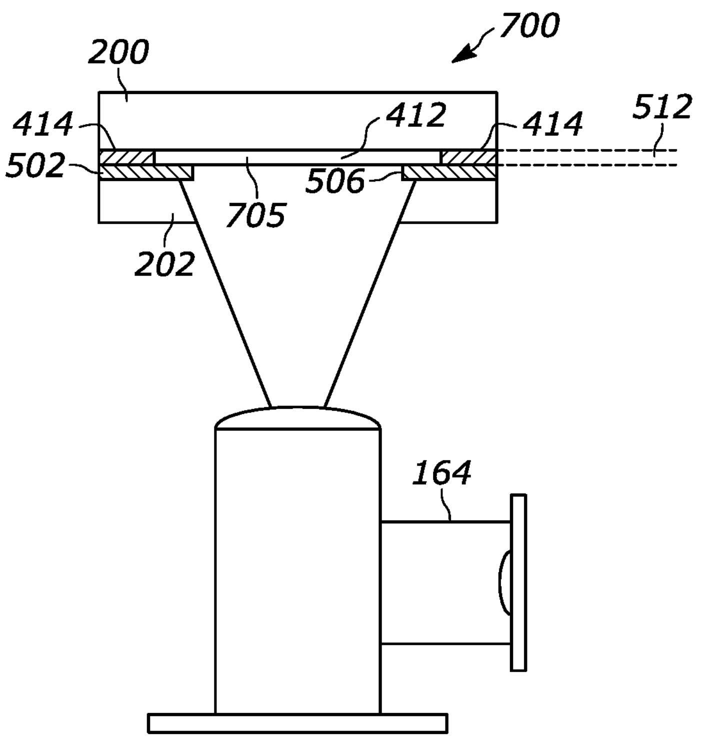
FIG. 10 is a cross-sectional view of the substrate of FIG. 9 showing the first plate positioned over top of the second plate and the imaging system obtaining image data of the portion aligned with the window of the substrate.

FIG. 10 is a cross-sectional view of the substrate 700 of FIG. 9 showing the first plate 200 positioned over top of the second plate 202 and the imaging system 164 obtaining image data of the portion 705 aligned with the window 506 of the substrate 700. The imaging system 164 obtains image data of each of the portions 705 as the corresponding portions are aligned with the window 506. The imaging system 164 and/or the system 100 may use the image data to determine an intensity value of the portion 510 viewable through the window 506. The imaging system 164 and/or the system 100 can use the intensity value and the thickness 512 of the gap 204 to determine a concentration of the portion 510. The channel 412 of the substrate 500 can be flushed and/or cleaned using the fluid 706 and/or using a liquid such as ethanol after the quantification processes are complete. The channel 412 of the substrate 700 may be dried by purging the substrate 700 with air.

Figure 11:
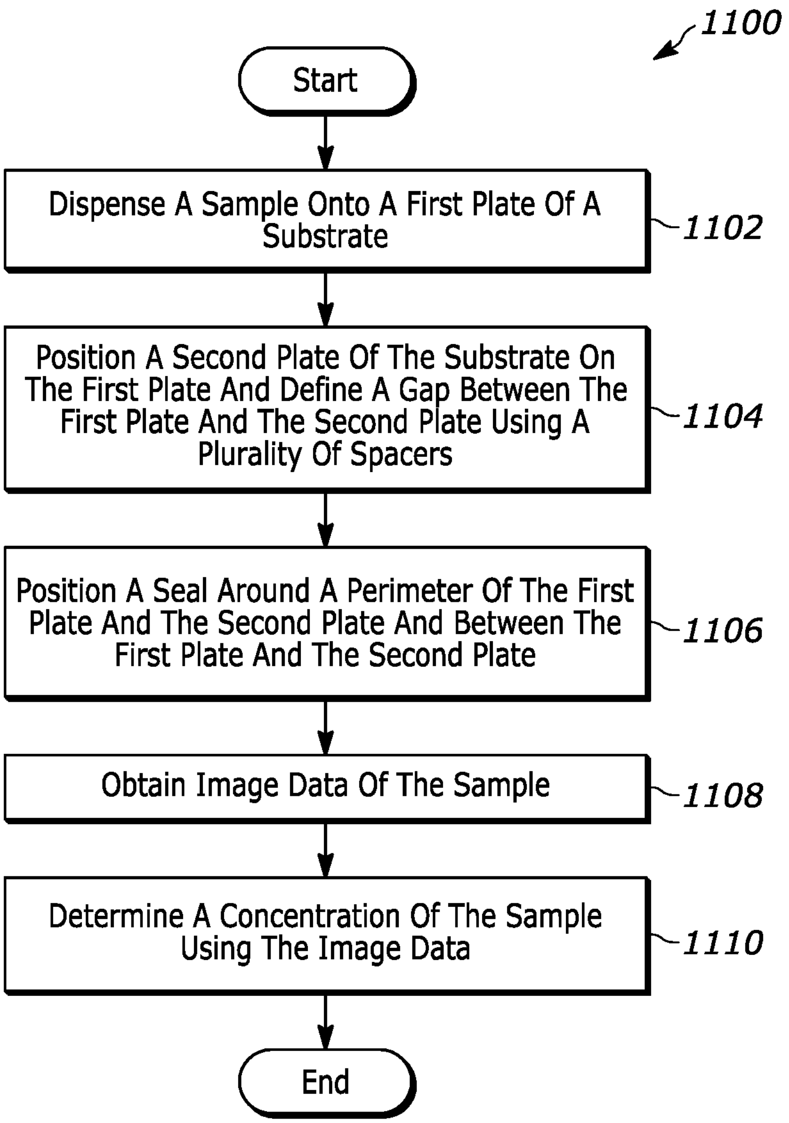
FIG. 11 illustrates a flowchart describing a process for using the substrates and the imaging system of FIGS. 1-10 or any of the other implementations disclosed herein.
Figure 12:
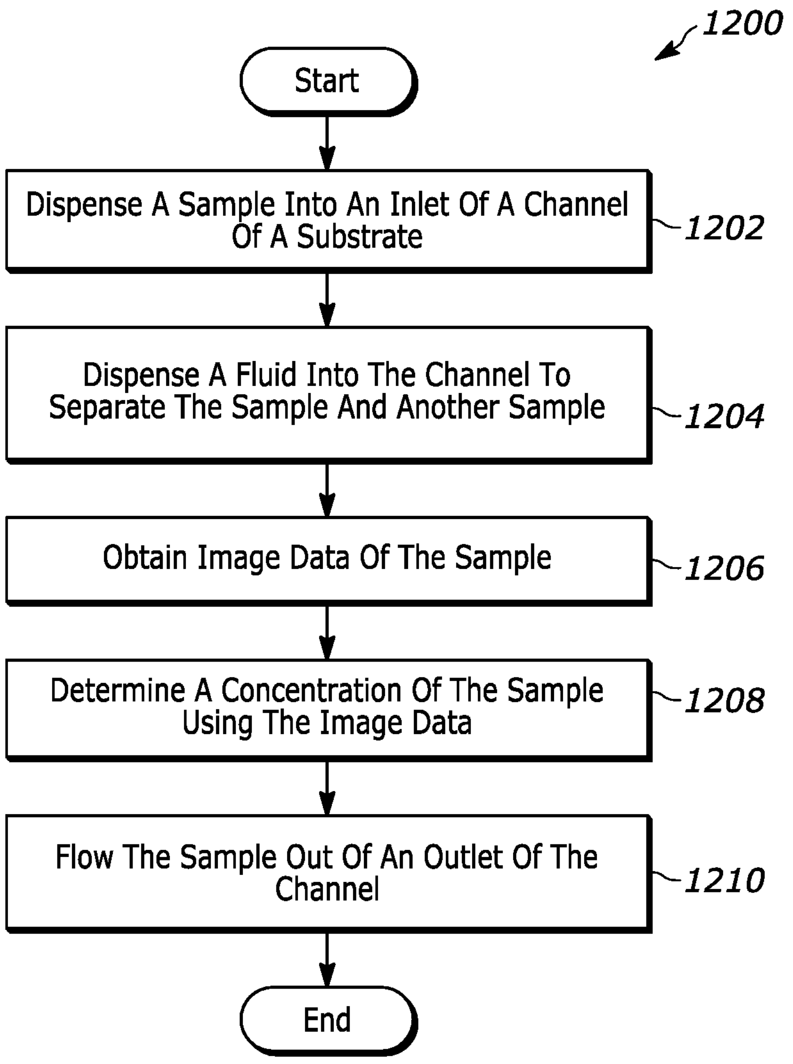
FIG. 12 illustrates another flowchart describing a process for using the substrates and the imaging system of FIGS. 1-10 or any of the other implementations disclosed herein.

FIGS. 11 and 12 illustrate flowcharts describing a process for using the substrates 162, 400, 500, 600, 700 and the imaging system 164 of FIGS. 1-10 or any of the other implementations disclosed herein. The order of execution of the blocks may be changed, and/or some of the blocks described may be changed, eliminated, combined and/or subdivided into multiple blocks.

The process of FIG. 11 begins with the sample 165 being dispensed onto the first plate 202 of the substrate 400 (Block 1102). The sample 165 dispensed may also be referred to as a portion of the sample 165. The second plate 200 of the substrate 400 is positioned on the first plate 202 and the gap 204 is defined between the first plate 202 and the second plate 200 using a plurality of spacers 402 (Block 1104). The spacers 402 are ball bearings 404 having opposing flat surfaces 406, 408 in some implementations. The seal 414 is positioned around a perimeter of the first plate 202 and the second plate 204 and between the first plate 202 and the second plate 200 (Block 1106). Image data of the sample 165 is obtained (Block 1108) and a concentration of the sample 165 is determined using the image data (Block 1110). The imaging system 164 obtains image data of the sample 165 in some implementations and the imaging system 164 and/or the system 100 uses the image data to determine a concentration of the sample 165.

The process of FIG. 12 begins with the sample 165 being dispensed in an inlet 206, 703 of the channel 212, 412 of the substrate 162, 700 (Block 1202). The sample 165 dispensed may also be referred to as a portion of the sample 165. A fluid 706 is dispensed into the channel 212, 412 to separate the sample 165 and another sample 165 (Block 1204). The fluid 706 includes oil in some implementations. The fluid 706 may be dispensed into the channel 212 by dispensing the fluid into the second inlet 702 and/or the third inlet 704 of the channel 212. Image data of the sample 165 is obtained (Block 1206). The image data may be obtained through the window 506 of the substrate 162, 700. The window 506 may be an unmasked region and the masked region 502 may surround the unmasked region. A concentration of the sample 165 may be determined using the image data (Block 1208) and the sample 165 may be flowed out of the outlet 208 of the channel 212, 412 (Block 1210). Flowing the sample 165 out of the outlet 208 of the channel 212, 412 may include urging the sample 165 out of the outlet 208 of the channel 212, 412 using negative pressure and/or using the fluid 706.

Figure 13:
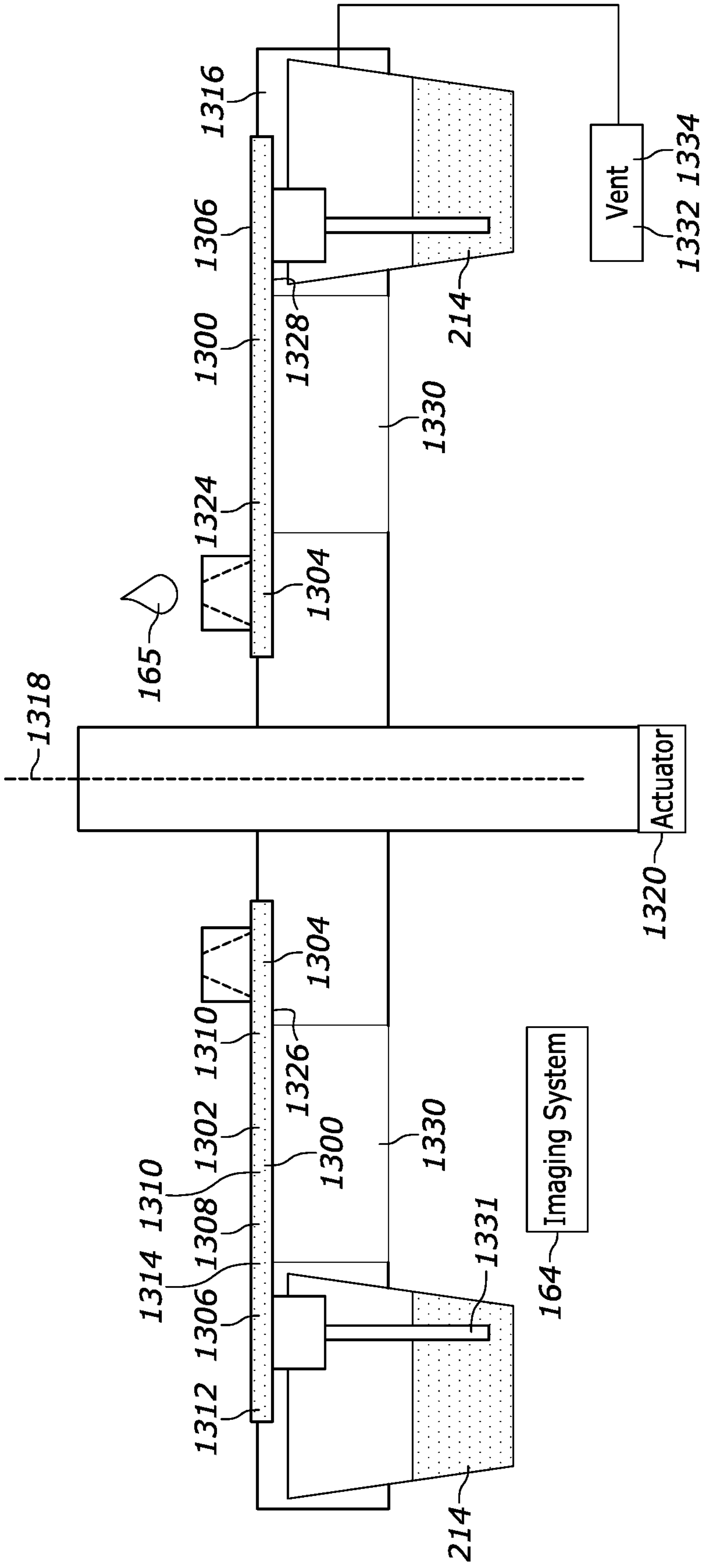
FIG. 13 is a schematic implementation of a substrate and the imaging system that can be used to implement the substrate and the imaging system of FIG. 1.

FIG. 13 is a schematic implementation of a substrate 1300 and the imaging system 164 that can be used to implement the substrate 162 and the imaging system 164 of FIG. 1. The substrate 1300 may be implemented by a microfluidic card and/or may be made of a pair of plates. The substrate 1300 has a channel 1302 including an inlet 1304 and an outlet 1306, and a valve 1308 disposed between the inlet 1304 and the outlet 1306. The channel 1302 has a first portion 1310 between the valve 1308 and the inlet 1304 and a second portion 1312 between the valve 1308 and the outlet 1306. A portion of a sample 165 is received within the first portion 1310 of the channel 1302 of the substrate 1300 in operation and the imaging system 165 obtains image data of the portion of the sample 165. The image data is used to determine a concentration of the portion of the sample 165.

The portion of the sample 165 is to flow from the first portion 1310, through the valve 1308, the second portion 1312, and the outlet 1306 after the image data of the portion of the sample 165 is obtained. The valve 1308 may be implemented by a mechanical valve such as an elastomer valve, a rotary face-sealing valve. The valve 1308 may be implemented by other mechanical valves, however. For example, the valve 1308 may be implemented by a rotary valve, a pinch valve, a flat valve, a solenoid valve, a check valve, and/or a piezo valve. The valve 1308 may be actuated to the open position if the valve 1308 is implemented by a mechanical valve to allow the portion of the sample 165 to flow from the first portion 1310, through the valve 1308, the second portion 1312, and the outlet 1306. The valve 1308 may alternatively be implemented by a virtual valve as further disclosed below.

A pump 1314 is also included that moves the sample 165 from the inlet 1304 to the outlet 106. The pump 1314 may be used to implement the pump 215 of FIG. 1. The pump 1314 has a plate 1316 including an axis of rotation 1318 and an actuator 1320 to rotate the plate 1316. The substrate 1300 is coupled to the plate 1316 and extends radially from the axis of rotation 1318.

A second substrate 1324 is shown coupled to the plate 1316 and extends radially from the axis of rotation 1318. The second substrate 1324 may be the same or similar to the substrate 1300. The plate 1316 has a first position 1326 and a second position 1328 and the substrate 1300 is shown positioned at the first position 1326 and the second substrate 1324 is shown positioned at the second position 1328. The first position 1326 is opposite the second position 1328. The second substrate 1324 may be a mirror image of the substrate 1300 on the plate 1316.

The pump 1314 includes an optical access area 1330. The optical access area 1330 allows the imaging system 164 to obtain the image data of the sample 165 within the channel 1302. The actuator 1320 may rotate the substrate 1300 and/or the second substrate 1324 to align the imaging system 164 with the corresponding substrate 1300, 1324 to allow the imaging data to be obtained.

The waste reservoir 214 is shown fluidly coupled to the outlet 1306. A waste spout 1331 is shown extending from the outlet 1306 into the waste reservoir 214. The waste reservoir 214 includes a vent 1332 in the implementation shown. The vent 1332 may include a porous frit 1334. The porous frit 1334 may be used to limit the escape of an aerosolized sample, for example. The waste reservoir 214 may be removable for draining and/or cleaning. The waste reservoir 214 may, thus, be reusable. The waste reservoir 214 may alternatively be a disposable microfluidic card assembly as an example.

Figure 14:
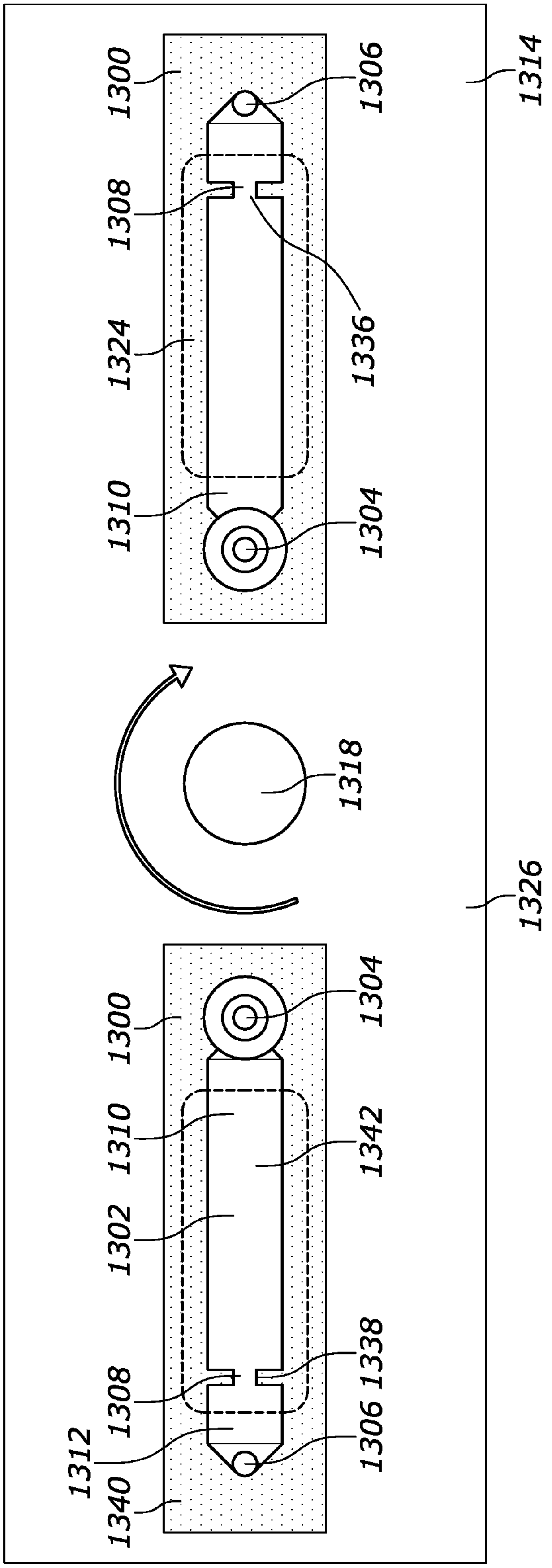
FIG. 14 is a top view of the substrate and the pump of FIG. 13.

FIG. 14 is a top view of the substrate 1300 and the pump 1314 of FIG. 13. The valve 1308 is shown as a virtual valve 1336 in the implementation shown. The virtual valve 1136 is formed by a constriction 1338. The constriction 1338 reduces a width of the channel 1302. The first portion 1326 of the channel 1302 has a first width, the second portion 1328 of the channel 1302 has a second width, and the virtual valve 1336 has a third width. The third width being less than the first width and the second width. The virtual valve 1336 may be associated with a sharp expansion in the geometry of the channel 1302 preceded by a sharp constriction in the geometry of the channel 1302. The virtual valve 1336 may be patterned into the substrate 1300 or formed at a micro-to-macro junction between the substrate 1300 and/or the channel 1302 of the substrate 1300 and the waste spout 1331.

The channel 1302 may have a height of between about 200 micrometers and about 500 micrometers in some examples. The channel 1302 may have a different height, however. The channel 1302 may hold about 2 microliters to about 200 microliters as an example.

The substrate 1300 includes a mask 1340 in the implementation shown. The mask 1340 may be an opaque mask. The mask 1340 defines a window 1342 that allows the imaging system 164 to obtain image data of a portion of the sample 165, for example.

Figure 15:
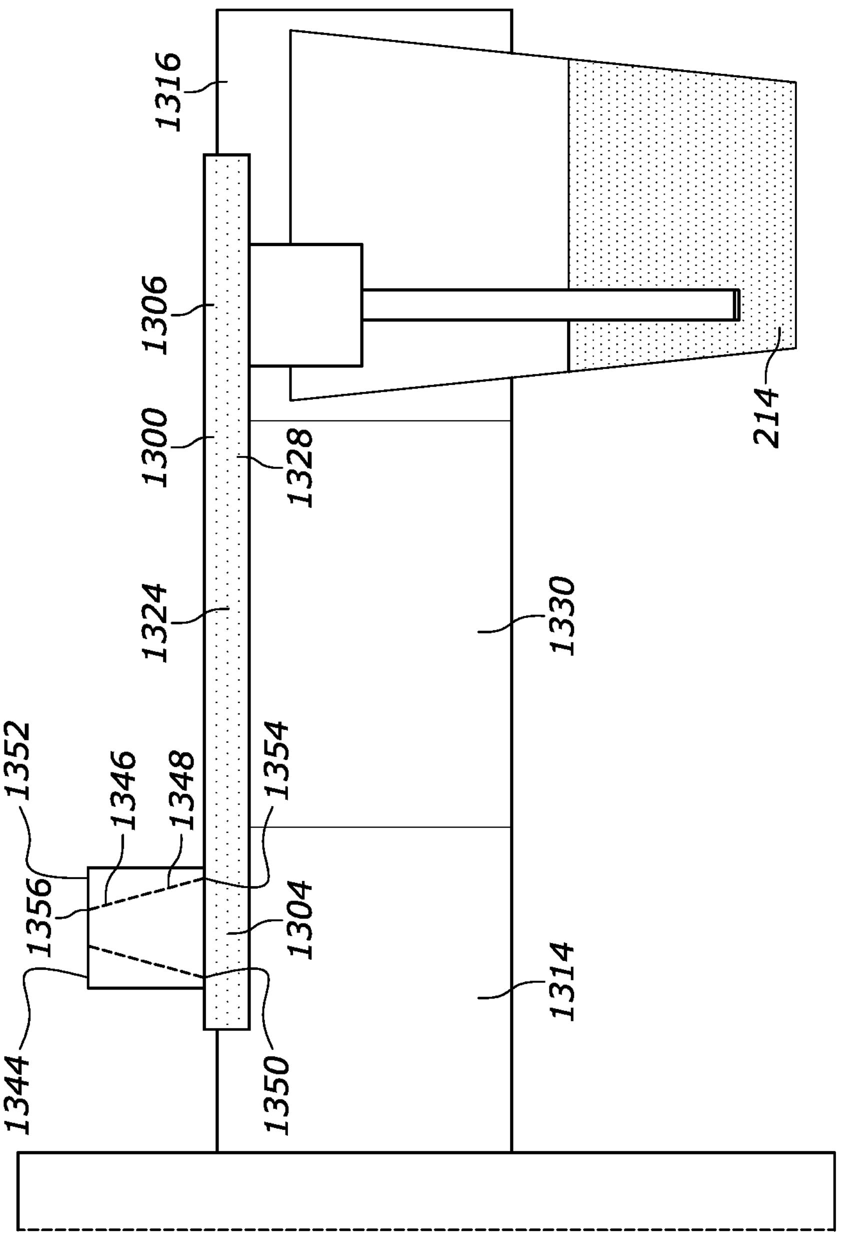
FIG. 15 is a detailed view of a portion of the substrate and the pump of FIG. 13.

FIG. 15 is a detailed view of a portion of the substrate 1300 and the pump 1314 of FIG. 13. An inlet port 1344 is positioned at the inlet 1304 that funnels the portion of the sample 165 into the channel 1302 in the implementation shown. The inlet port 1344 includes a flow passage 1346. The flow passage 1346 is shown as a frustrum-shaped flow passage 1348. The flow passage 1346 may have a different shape, however. The flow passage 1346 may be cylindrical as an example.

The inlet port 1344 includes a first surface 1350 and a second surface 1352. The first surface 1350 is coupled to the substrate 1300. The frustrum-shaped flow passage 1348 has a base opening 1354 at the first surface 1350 and a top opening 1356 at the second surface 1352. The base opening 1354 has a perimeter and the inlet 1304 of the channel 1302 may be tangential to the base opening 1354 in some implementations. The base opening 1354 may be radially offset from the inlet 1304, for example.

Figure 16:
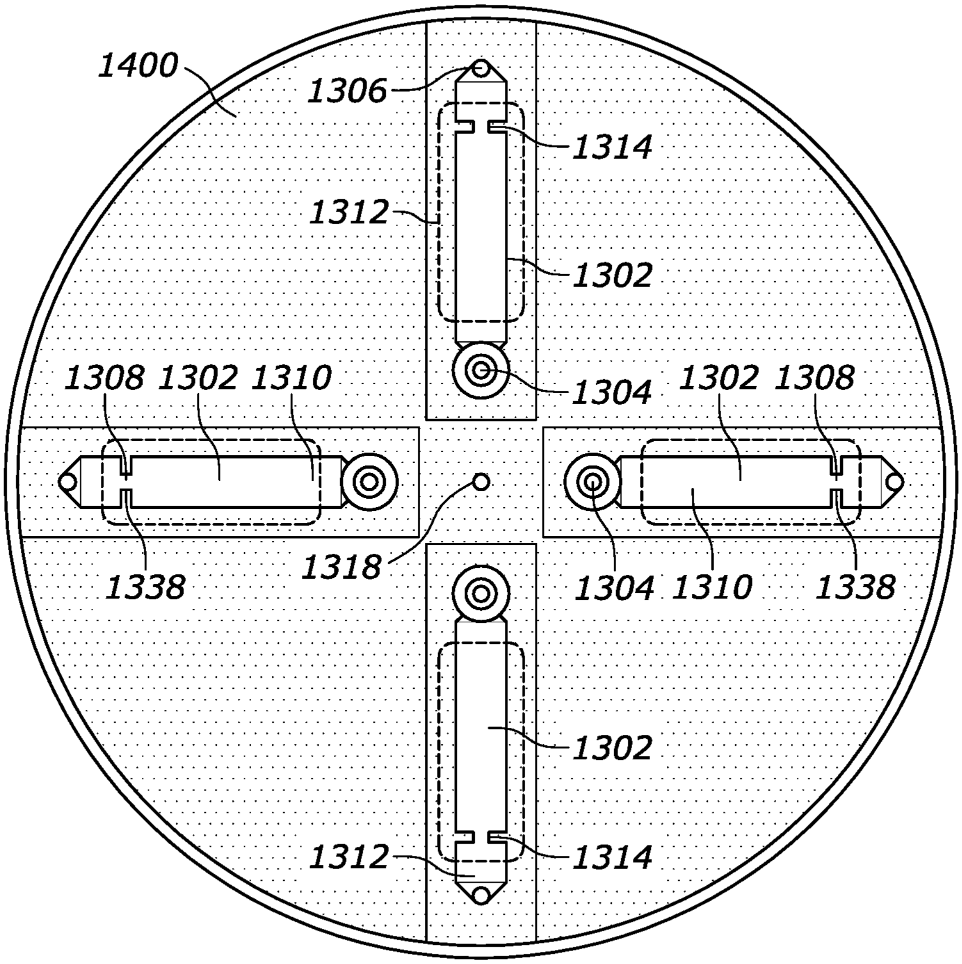
FIG. 16 is a schematic implementation of a circular substrate that can be used to implement the substrate and the pump of FIG. 1.

FIG. 16 is a schematic implementation of a circular substrate 1400 that can be used to implement the substrate 162 and the pump 215 of FIG. 1. The circular substrate 1400 includes a plurality of channels 1302, where each channel 1302 has an inlet 1304 and an outlet 1306, and a valve 1308 disposed between the inlet 1304 and the outlet 1306. The circular substrate 1400 may be implemented by a plastic disc and/or a circular wafer. The circular substrate 1400 includes an axis of rotation 1318, further comprising an actuator may be used to rotate the circular substrate 1400 about the axis of rotation 1318. The actuator may be a rotary actuator, for example. The channels 1302 extend radially from the axis of rotation 1318 in the implementation shown.

Figure 17:
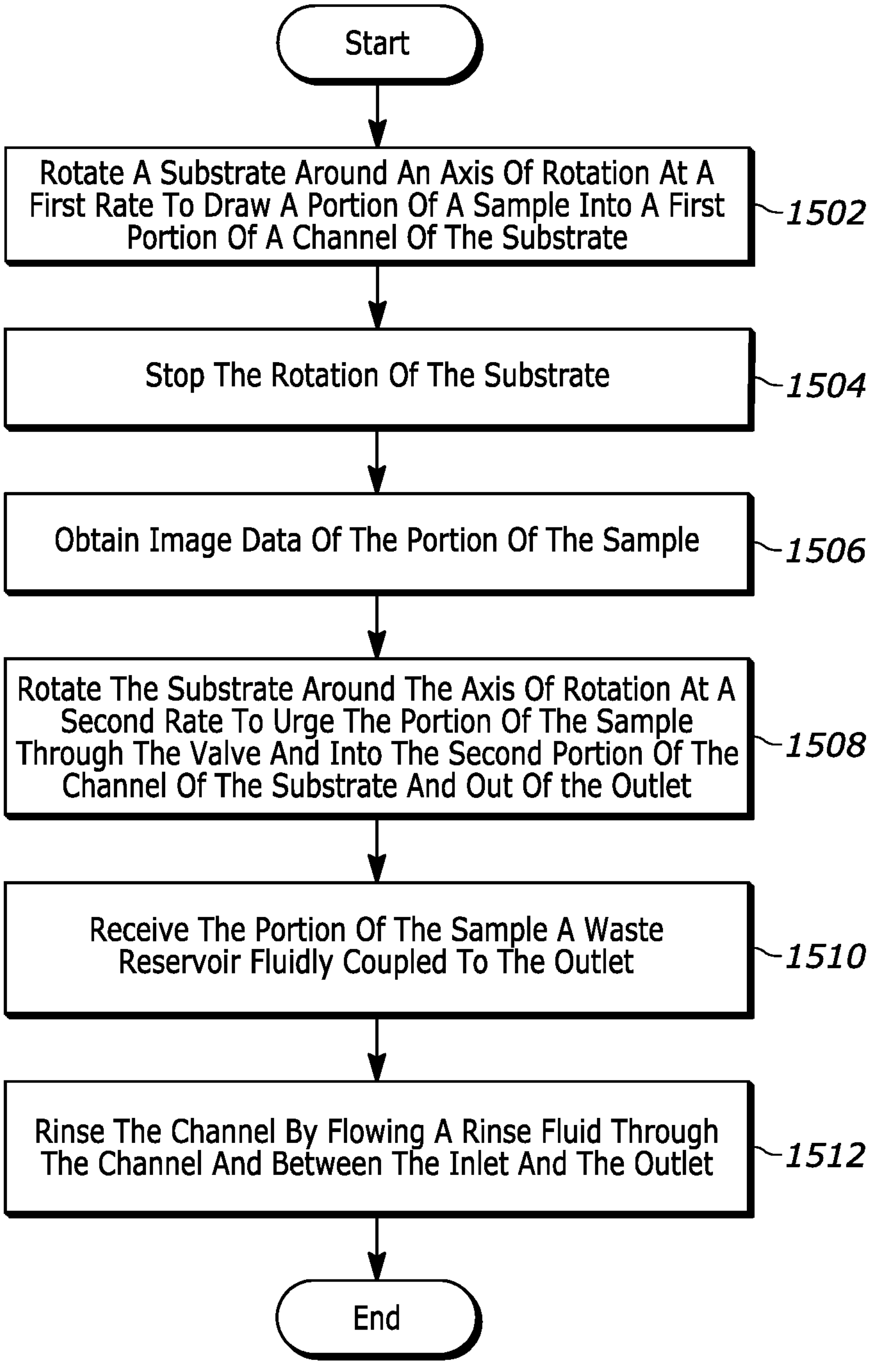
FIG. 17 illustrates a flowchart for a method of implementing the examples disclosed herein.
Figure 18:
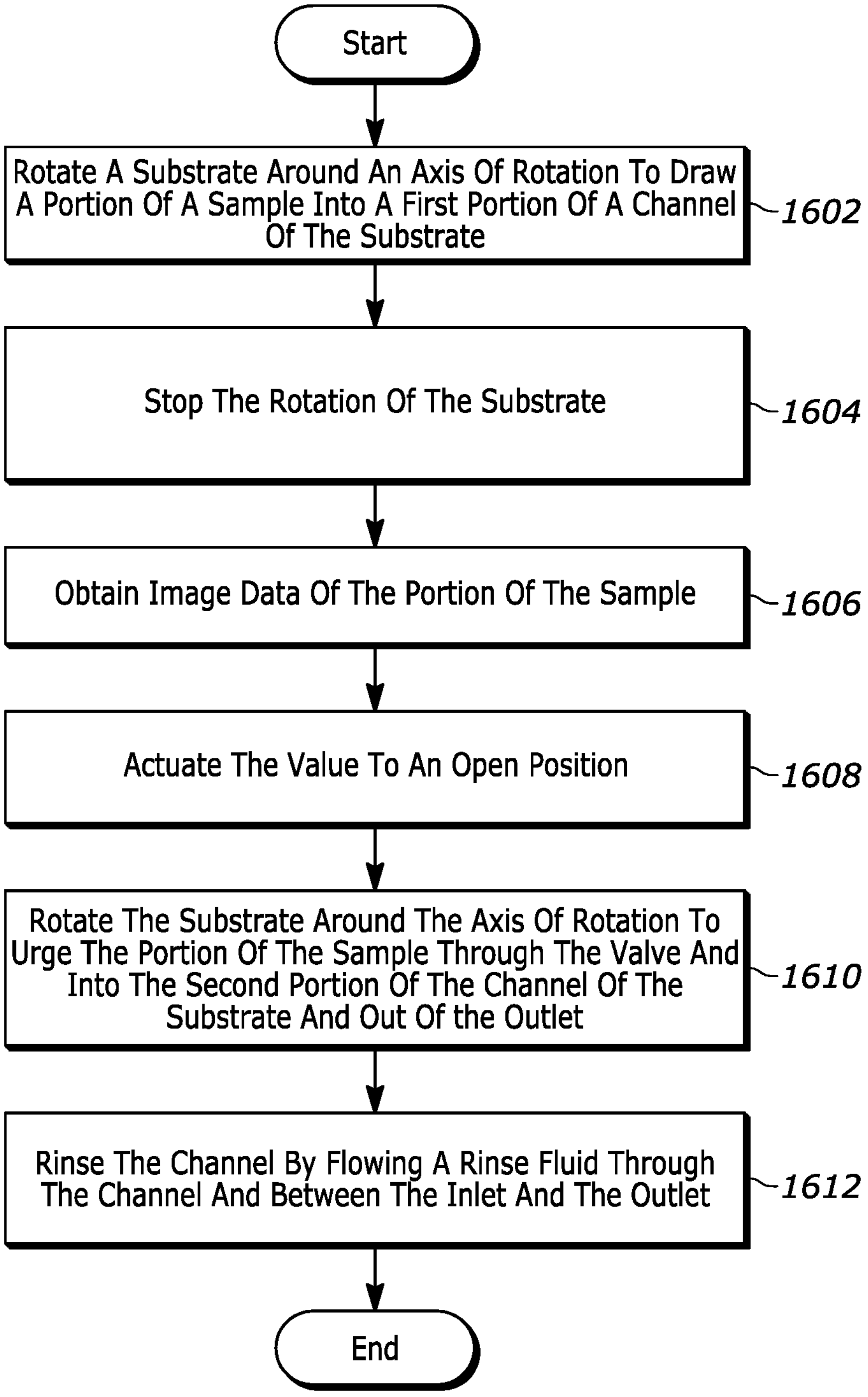
FIG. 18 illustrates another flowchart for a method of implementing the examples disclosed herein.

FIGS. 17-18 illustrate flowcharts for methods of implementing the examples disclosed herein. The order of execution of the blocks may be changed, and/or some of the blocks described may be changed, eliminated, combined and/or subdivided into multiple blocks.

The process of FIG. 17 begins with the substrate 1300, 1400 being rotated around an axis of rotation 1318 at a first rate to draw a portion of a sample 165 into a first portion 1310 of a channel 1302 of the substrate 1300, 1400 (Block 1502). The substrate 1300, 1400 includes the channel 1302, the inlet 1304, the outlet 1306 in fluid communication with the channel 1302, and the valve 1308 disposed between the inlet 1304 and the outlet 1306. The channel 1302 includes the first portion 1310 between the valve 1308 and the inlet 1304 and the second portion 1312 between the valve 1308 and the outlet 1306. The valve 1308 may include the virtual valve 1336. The virtual valve 1336 may include the constriction 1338.

The rotation of the substrate 1300, 1400 is stopped (Block 1504) and image data of the portion of the sample 165 is obtained (Block 1506). The image data may be used to determine a concentration of the portion of the sample 165, for example.

The substrate 1300, 1400 is rotated around the axis of rotation 1318 at a second rate to urge the portion of the sample 165 through the valve 1308 and into the second portion 1312 of the channel 1302 of the substrate 1300, 1400 and out of the outlet 1306 (Block 1508). The portion of the sample 165 is received in a waste reservoir 214 fluidly coupled to the outlet 1306 (Block 1510). The channel 1302 is rinsed by flowing a rinse fluid through the channel 1302 and between the inlet 1304 and the outlet 1306 (Block 1512).

The process of FIG. 18 begins by the substrate 1300, 1400 being rotated around an axis of rotation 1318 to draw a portion of a sample 165 into a first portion 1310 of a channel 1302 of the substrate 1300, 1400 (Block 1602). The substrate 1300, 1400, includes the channel 1302, the inlet 1304, the outlet 1306 in fluid communication with the channel 1302, and the valve 1308 disposed between the inlet 1304 and the outlet 1306. The channel 1302 includes the first portion 1310 between the valve 1308 and the inlet 1304 and the second portion 1312 between the valve 1308 and the outlet 1306. The rotation of the substrate 1300, 1400 is stopped (Block 1604).

Image data of the portion of the sample 165 is obtained (Block 1606). The image data may be used to determine a concentration of the portion of the sample 165. The valve 1308 is actuated to an open position (Block 1608) and the substrate 1300, 1400 is rotated around the axis of rotation 1318 to urge the portion of the sample 165 through the valve 1308 and into the second portion 1312 of the channel 1302 of the substrate 1300, 1400 and out of the outlet 1306 (Block 1610). The valve 1308 may be implemented by a mechanical valve in such an implementation. The channel 1302 is rinsed by flowing a rinse fluid through the channel 1302 and between the inlet 1304 and the outlet 1306 (Block 1612). The rinse fluid may be removed from the channel 1302 by the centrifugal force of rotating the substrate 1300, 1400.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In one example, these terms include situation where there is no variation—0%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:

a contact dispenser;

a stage coupled to and used to move the contact dispenser;

a substrate comprising a pair of plates and a plurality of spacers positioned between the plates to define a gap between the pair of plates, wherein the substrate comprises an inlet and an outlet in fluid communication with the gap, the outlet opening downwardly to waste; and an imaging system, wherein, to perform a quantification process, the stage aligns the contact dispenser with the inlet of the substrate and the contact dispenser dispenses a portion of a sample into the inlet of the substrate, and wherein the imaging system is to obtain image data of the portion of the sample, the image data to be used to determine a concentration of the portion of the sample.

2. The apparatus of claim 1, wherein the spacers comprise ball bearings having opposing flat surfaces.

3. The apparatus of claim 1, wherein the plurality of spacers comprises three spacers.

4. The apparatus of claim 1, wherein the gap is about 500 micrometers.

5. The apparatus of claim 1, wherein a channel is defined between the pair of plates.

6. The apparatus of claim 5, wherein the substrate further comprises a seal positioned between the pair of plates and defines the channel.

7. The apparatus of claim 6, wherein the seal is positioned around a perimeter of the pair of plates.

8. The apparatus of claim 1, wherein the substrate comprises a mask.

9. The apparatus of claim 8, wherein the mask is an opaque mask.

10. The apparatus of claim 9, wherein one of the pair of plates comprises the opaque mask and the opaque mask defines a window through which the imaging system is to obtain the image data of the portion of the sample.

11. The apparatus of claim 1, wherein the substrate comprises a plurality of channels.

12. The apparatus of claim 1, wherein the inlet comprises a first inlet, and the substrate further comprises a second inlet and a third inlet in fluid communication with the gap.

13. The apparatus of claim 1, further comprising a centrifugal pump to move the sample from the inlet to the outlet.

14. A method, comprising:

performing a quantification process, comprising:

aligning a contact dispenser using a stage with a first plate of a substrate;

dispensing, using the contact dispenser, a sample onto the first plate of the substrate;

positioning a second plate of the substrate on the first plate and defining a gap between the first plate and the second plate using a plurality of spacers wherein the spacers comprise ball bearings having opposing flat surfaces;

obtaining image data of the sample; and determining a concentration of the sample using the image data.

15. The method of claim 14, wherein the plurality of spacers comprises three spacers.

16. The method of claim 14, further comprising positioning a seal around a perimeter of the first plate and the second plate.

17. A method, comprising:

performing a quantification process, comprising:

aligning a contact dispenser using a stage with an inlet of a channel of a substrate;

dispensing a sample in the inlet of the channel of the substrate using the contact dispenser;

obtaining image data of the sample;

determining a concentration of the sample using the image data; and flowing the sample downwardly out of an outlet of the channel to waste.

18. The method of claim 17, wherein obtaining the image data comprises obtaining the image data through a window of the substrate.

19. The method of claim 18, wherein the window comprises an unmasked region and wherein a masked region may surround the unmasked region.

20. The method of claim 17, further comprising dispensing a fluid into the channel to separate the sample and another sample.

21. The method of claim 20, wherein the fluid comprises oil.

22. The method of claim 20, wherein dispensing the fluid into the channel comprises dispensing the fluid into a second inlet of the channel.

23. The method of claim 17, wherein flowing the sample out of the outlet of the channel comprises urging the sample out of the outlet of the channel using negative pressure.

24. The method of claim 17, wherein flowing the sample out of the outlet of the channel comprises urging the sample out of the outlet of the channel using a fluid.

25. An apparatus, comprising:

a contact dispenser;

a stage coupled to and used to move the contact dispenser;

a substrate, comprising:

a channel including an inlet and an outlet; and a valve disposed between the inlet and the outlet, wherein the channel comprises a first portion between the valve and the inlet and a second portion between the valve and the outlet; and an imaging system, wherein, to perform a quantification process, the stage aligns the contact dispenser with the inlet of the substrate and the contact dispenser dispenses a portion of a sample into the inlet of the substrate, and wherein the imaging system is to obtain image data of the portion of the sample, the image data to be used to determine a concentration of the portion of the sample.

26. The apparatus of claim 25, further comprising a pump to move the sample from the inlet to the outlet.

27. An apparatus, comprising:

a substrate, comprising:

a channel including an inlet and an outlet; and a valve disposed between the inlet and the outlet, wherein the channel comprises a first portion between the valve and the inlet and a second portion between the valve and the outlet;

a pump to move the sample from the inlet to the outlet; and an imaging system, wherein a portion of a sample is to be received within the first portion of the channel of the substrate and the imaging system is to obtain image data of the portion of the sample, the image data to be used to determine a concentration of the portion of the sample, wherein the pump comprises a plate comprising an axis of rotation and an actuator to rotate the plate, the substrate coupled to the plate and extending radially from the axis of rotation.

28. The apparatus of claim 27, further comprising a second substrate coupled to the plate and extending radially from the axis of rotation.

29. The apparatus of claim 28, wherein the plate comprises a first position and a second position, the substrate positioned at the first position and the second substrate positioned at the second position, the first position opposite the second position.

* * * * *